US006493729B2

(12) United States Patent
Gusler et al.

(10) Patent No.: US 6,493,729 B2
(45) Date of Patent: *Dec. 10, 2002

(54) METHOD AND SYSTEM TO ADMINISTER MIRRORED FILESYSTEMS

(75) Inventors: Carl Phillip Gusler, Austin, TX (US); Rick A. Hamilton, II, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,277

(22) Filed: Sep. 23, 1999

(65) Prior Publication Data

US 2002/0152230 A1 Oct. 17, 2002

(51) Int. Cl.[7] .............................................. G06F 17/30
(52) U.S. Cl. ....................... 707/204; 707/200; 707/201; 707/202; 707/203; 707/10
(58) Field of Search ........................... 707/10, 200–204; 711/111–114

(56) References Cited

U.S. PATENT DOCUMENTS

| | | | | |
|---|---|---|---|---|
| 5,129,088 A | * | 7/1992 | Auslander et al. ........... 707/203 |
| 5,394,526 A | | 2/1995 | Crouse et al. ............... 395/200 |
| 5,435,004 A | * | 7/1995 | Cox et al. .................... 711/112 |
| 5,819,310 A | * | 10/1998 | Vishlitzky et al. .......... 711/114 |
| 5,850,522 A | * | 12/1998 | Wlaschin .................... 711/111 |
| 5,890,156 A | | 3/1999 | Rekieta et al. ................ 707/10 |
| 5,991,860 A | * | 11/1999 | Gross et al. ................. 711/173 |
| 6,035,412 A | * | 3/2000 | Tamer et al. ................... 714/6 |
| 6,119,131 A | * | 9/2000 | Cabrera et al. ............. 707/203 |
| 6,185,666 B1 | * | 2/2001 | Murray et al. .............. 711/173 |
| 6,216,202 B1 | * | 4/2001 | D'Errico ..................... 711/112 |
| 6,237,063 B1 | * | 5/2001 | Bachmat et al. ............ 711/114 |

* cited by examiner

Primary Examiner—Jean M. Corrielus
Assistant Examiner—Cam-Y T Truong
(74) Attorney, Agent, or Firm—Duke W. Yee; David A. Mims, Jr.; Lisa L. B. Yociss

(57) ABSTRACT

The automated splitting process begins by setting appropriate names and values for the new and old filesystems, physical volumes, and logs. Logs are updated for the split. Next, names and values are checked for validity and to see that a specified value is not contrary to the operating system's parameters. The split is performed with specified copies placed into specified logical volumes and filesystems. The automated merging process begins by setting appropriate names and values for log files, and by setting filesystem names to be merged and synchronized. Logs are updated for the merge. Next, names and values are checked for validity and to see that a specified value is not contrary to the operating system's parameters. The secondary filesystem is deleted, and the logical volumes are merged, creating the mirror out of the secondary filesystem.

26 Claims, 22 Drawing Sheets

```
#!/bin/ksh
####################################################################

# split_fs_copy.ksh
#              Version 0.34
#                       Runs various AIX commands to split filesystem copy

#                       Assembled by Carl Gusler
IBM Global Services
IBM Austin
cgusler@us.ibm.com

(With help from many friends)

Copyright IBM 1996, 1997, 1998, 1999
Controlled Distribution
Protected under the procedures, processes, rights
rules, regulations, and retributions of
IBM Global Services
Intellectual Capital Management

####################################################################

#---------------------------------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.
```

*FIG. 7A*

```

#                This program is distributed on an "as is" basis,
no warranty is expressed or implied.

#------------------------------------------

#------------------------------------------

# Description: Split mirrored copies at filesystem level
#              Part of FSCPBK package, but independent of other
scripts in package.
# Operational Environment: AIX V4
# Input:
# Output:
# Return Value:
# Comments:
#    This script is built upon the AIX command splitlvcopy:
#       !WARNING!!!!!!!!!!!!!!!!!!!!!!!!!!!!!!!!!!!!!!!!!!!!
#       Splitting an open logical volume may cause data loss or corruption
#       and is not supported by IBM. IBM will not be held responsible for
#       data loss or corruption caused by splitting an open logical volume.

#------------------------------------------

#------------------------------------------

# Version History: None

#------------------------------------------

#------------------------------------------

# Environmental Variables

#------------------------------------------
# Constants

# Variables
numeric_date=$(date +%m%d%y)
text_date=$(date +%d%b%Y)
typeset -i return_code
typeset -i retain_days=90
typeset -i in_retain_days
typeset -i in_copies
typeset -i mount_test
typeset -i exist_fs_test
typeset -i exist_pv_test
typeset -i copies
typeset -i strictness
```

*FIG. 7B*

```
invoked_name=$0
script_name=${invoked_name##*/}

# Process Control Variables
y_flag=0
Y_flag=0
n_flag=0
c_flag=0
f_flag=0
p_flag=0
o_flag=0 l_flag=0
L_flag=0
r_flag=0

Files default_log_dir=/var/adm/scriptlogs
default_log_file=$script_name.$text_date
work_file1=/tmp/$script_name.wrk1

#----------------------------------

# Function: show_usage
#     Description: Displays command usage syntax and exits
#     Input: None
#     Output: Usage message to standard error
#     Return Value: 2
#     Note: This function does not return. It completely exits.

#----------------------------------
show_usage()
{
  print -u2"            "
  print -u2 "Usage: split_fs_copy.ksh -y LVname -f oldfilesystem -n newfilesystem -c copies [-p hdisk] [-o ] [-l directory] [-r days] [ -L ] "
  print -u2 "          -f filesystem  Existing filesystem."
  print -u2 "          "
  print -u2 "          -n filesystem  New filesystem."
  print -u2 "          "
  print -u2 "          -y LVname      New logical volume name."
  print -u2 "          "
# print -u2 "          -Y prefix      New logical volume prefix."
# print -u2 "          "
  print -u2 "          -c copies      Copies left in old logical volume."
  print -u2 "          "
  print -u2 "          -p hdisk       Physical volume to remove copies from."
  print -u2 "          "
```

FIG. 7C

```
            print -u2 "    -o        Override active volume protection."
            print -u2 "              WARNING!!: Data integrity risk."
            print -u2 "              IBM not responsible for"
            print -u2 "              loss of data or integrity"
            print -u2 "              if override used!"
            print -u2 "    "
            print -u2 "    -l directory  Log output directory."
            print -u2 "              Default is" $default_log_dir
            print -u2 "    "
            print -u2 "    -r days   Log retention period."
            print -u2 "              Default is" $retain_days
            print -u2 "    "
            print -u2 "    -L        Prevent results logging."
            print -u2 "    "
            exit 2
}
#-----------------------------------------------

# Korn Shell Settings

#-----------------------------------------------
#set -o errexit     # Turn on error trapping and error exit mode
#set -o noclobber   # Prevent overwriting of existing files
#set -o noexec      # Perform syntax checking without execution
#set -o nolog       # Prevents storing function defs in history file
#set -o xtrace      # Turn on debug mode

#-----------------------------------------------

# Main Routine

#              _____
#          ____/  |     BRUTE FORCE APPLIED HERE!
#          |||||  |
#         /| __|_____|_  Suggestions for refinement and elegance
#        / |=(0 0 0 0)        are always welcome.
# 110110111/__|  ---------
#-----------------------------------------------

log_dir=$default_log_dir
# Parse Command Line Arguments into Variables
while getopts f:n:y:c:p:o|:Lr# c
do
    case $c in
    f)  # Set up the -f flag
        f_flag=1
        in_filesystem=$OPTARG;;
    n)  # Set up the -n flag
        n_flag=1
        in_newfilesystem=$OPTARG;;
```

FIG. 7D

```
    y)    # Set up the -y flag
          y_flag=1
          in newlvname=$OPTARG;;
#   Y)    # Set up the -Y flag
#         Y_flag=1
#         in_newprefix=$OPTARG;;
    c)    # Set up the -c flag
          c_flag=1
          in_copies=$OPTARG;;
    p)    # Set up the -p flag
          p_flag=1
          in_hdisk=$OPTARG;;
    o)    # Set up the -o flag
          o_flag=1;;
    L)    # Set up the -L flag
          L_flag=1;;
    l)    # Set up the -l flag
          l_flag=1
          log_dir=$OPTARG;;
    r)    # Set up the -r flag
          r_flag=1
          in_retain_days=$OPTARG;;
    :)    show_usage;;
    \?)   show_usage;;
    esac
done
shift$((OPTIND-1))

Deal with invocation errors

Test for mandatory flags if [[ (y_flag -eq 0) || (n_flag -eq 0) || (c_flag -eq 0) || (f_flag -eq 0) ]]; then
    show_usage
fi

# Configure Logging
if [[ $L_flag -eq 1 ]]; then
    log_file=/dev/null          # Log to bit bucket
elif [[ $l flag -eq 1 ]]; then
    log_file=$in_log_dir/$default_log_file
    mkdir -p $in_log_dir 2>dev/null       #Create new log directory
else
    log_file=$default_log_dir/$default_log_file
    mkdir -p $default_log_dir 2>/dev/null # Create default log directory
fi
if [[ $r_flag -eq 1 ]]; then
    retain_days=$in_retain_days
```

Clear old log files
find $log_dir -name "$script_name*" -mtime $retain_days -exec rm {}\;

# Create new log file
exec 3>> $log_file # Open log file for writing
print -u3 "\n=================================================="
print -u3 "=                                                ="
print -u3 "=  Systems Management Transaction Log            ="
print -u3 "=                                                ="
print -u3 "=    Created by script:" $script_name
print -u3 "=          on system[" $(hostname)
print -u3 "=          at     [" $(date)
print -u3 "=                                                ="
print -u3 "=================================================="

Perform Work

# Test for valid existing old filesystem
exist_fs_test=$(lsfs -ac | grep "$in_filesystem:" | wc -l)
if [[ $exist_fs_test -eq 0 ]]; then
    print -u2 "Primary filesystem" $in_filesystem "does not exist."
    print -u3 "Primary filesystem" $in_filesystem "does not exist."
    exit 99
fi

# Test that old filesystem is mirrored
logical_vol=$(lsfs -c $in_filesystem | grep $in_filesystem | cut -f 2 -d : | cut -c 6-)
# echo $logical_vol   Use for debug in case of interversion output change
# copies=$(lslv $logical_vol | grep COPIES | cut -c 21)
copies=$(lslv $logical_vol | grep COPIES | awk { print $2 }')
# echo $copies        Use for debug in case of interversion output change
if [[ $copies -lt 2 ]];then
    print -u2 "Primary filesystem" $in_filesystem "is not mirrored."
    print -u3 "Primary filesystem" $in_filesystem "is not mirrored."
    exit 98
fi

# Test for invalid existing new filesystem
exist_fs_test=$(lsfs -ac | grep "$in_newfilesystem:" | wc -l)
if [[ $exist_fs_test -ne 0 ]]; then
    print -u2 "Secondary filesystem" $in_newfilesystem "already exists."
    print -u3 "Secondary filesystem" $in_newfilesystem "already exists."
    exit 97
fi

# Test for invalid existing new logical volume
exist_fs_test=$(lslv -c $in_newlvname 2>/dev/null | wc -l)
```

```
if [[ $exist_fs_test -ne 0 ]]; then
    print -u2 "Secondary logical volume" $in_newlvname "already exists."
    print -u3 "Secondary logical volume" $in_newlvname "already exists."
    exit 96
fi

# Test for invalid number of remaining copies
if [[ $in_copies -ge 3 ]]; then
    print -u2 "Invalid number of copies specified."
    print -u3 "Invalid number of copies specified."
    exit 95
fi

# Test for non-strict mirroring (PVs does not match mirror count)
strictness=$(lslv $logical_vol | grep "EACH LP COPY ON" | grep yes | wc -l)
if [[ $strictness -eq 0 ]];then
    print -u2 "Warning: Mirror lax strictness may prevent expected results."
    print -u3 "Warning: Mirror lax strictness may prevent expected results."
fi

# Test for invalid disks
if [[ $p_flag -eq 1 ]]; then
    exist_pv_test=$(lspv $in_hdisk 2>/dev/null | wc -l)
    if [[ $exist_pv_test -eq 0 ]]; then
        print -u2 "Invalid physical volume" $in_hdisk "specified."
        print -u3 "Invalid physical volume" $in_hdisk "specified."
        exit 94
    else
# Test for FS on proper disk
#    Watch out for false positive! Change in way to test for multiple
#        filesystems with recursive mountpoints
#    if [[ $(lspv -l $in_hdisk | grep $in_filesystem | wc -l) -ne 1 ]]; then
        if [[ $(lspv -l $in_hdisk | grep $logical_vol | wc -l) -ne 1 ]]; then
            print -u2 "Filesystem" $in_filesystem "does not reside on physical volume" $in_hdisk
            print -u3 "Filesystem" $in_filesystem "does not reside on physical volume" $in_hdisk
        fi fi
fi
lvname=$(lsfs -c $in_filesystem | grep $in_filesystem | cut -f 2 -d: | cut -c6-)

# Perform split
if [[ ($o_flag -eq 1) || ($p_flag -eq 1) ]]; then
    print -u3 "splitlvcopy -f -y" $in_newlvname $lvname $in_copies $in_hdisk
    sync;sync
    splitlvcopy -f -y $in_newlvname $lvname $in_copies $in_hdisk >>$log_file 2>>$log_file
    return_code=$?
```

```
elif [[ ($o_flag -ne 1) || ($p_flag -eq 1) ]]; then
    print -u3 "splitlvcopy -y" $in_newlvname $lvname $in_copies $in_hdisk
    sync;sync
    splitlvcopy -y $in_newlvname $lvname $in_copies $in_hdisk >>$log_file 2>>$log_file
    return code=$?
elif [[ ($o_flag -eq 1) || ($p_flag -ne 1) ]]; then
    print -u3 "splitlvcopy -y" $in_newlvname $lvname $in_copies
    sync;sync
    splitlvcopy -f -y $in_newlvname $lvname $in_copies >>$log_file 2>>$log_file
    return_code=$?
else
    print -u3 "splitlvcopy -y" $in_newlvname $lvname $in_copies
    sync;sync
    splitlvcopy -y $in_newlvname $lvname $in_copies >>$log_file 2>>$log_file
    return_code=$?
fi

# Test for successful LV split
if [[ $return_code -ne 0 ]]; then
    print -u2 "Filesystem Split not successful."
    print -u3 "Filesystem Split not successful."
    exit 1
fi

# Create new filesystem mount point
mkdir -p $in_newfilesystem 2>/dev/null exec 4> $work_file1 # Open work file for writing
volume_group=$(lslv $lvname | grep "VOLUME GROUP" | cut -c60-)
volume_group=$(lslv $lvname | grep "VOLUME GROUP" | awk'{ print $6 }')
log=$(lsvg -l $volume_group | grep jfslog | grep open | cut -f1 -d " ")
print -u4 " "
print -u4 $in_newfilesystem":"
print -u4 "    dev = /dev/"$in_newlvname
print -u4 "    vfs = jfs"
print -u4 "    log = /dev/"$log
print -u4 "    mount = true"
print -u4 "    options = ro"
print -u4 "    account = false"
exec 4<&-
cat $work_file1 >>/etc/filesystems
```

*FIG. 7H*

```
fi if [[ $return_code -eq 0 ]]; then
    print -u3 "\n Completed successfully at" $(date)
else
    print -u3 "\n Completed UNSUCCESSFULLY at" $(date)
fi
print -u3 "\n=================================================="
print -u3 "=                                                ="
print -u3 "= Systems Management Transaction Log             ="
print -u3 "=                                                ="
print -u3 "=   Completed at    :" $(date)
print -u3 "=                                                ="
print -u3 "=================================================="

exec 3<&-
rm $work_file1
```

*FIG. 7I*

```
print -u3 "\n=================================================="
print -u3 "=                                                ="
print -u3 "= Systems Management Transaction Log             ="
print -u3 "=                                                ="
print -u3 "=   Completed at    :" $(date)
print -u3 "=                                                ="
print -u3 "=================================================="

exec 3<&-
```

*FIG. 8H*

```
#!/bin/ksh
###################################################################

# merge_fs_copy.ksh
#            Version 0.34
#                   Runs various AIX commands to merge filesystem
#            into one mirrored filesystem

#                   Assembled by Carl Gusler
IBM Global Services
IBM Austin
cgusler@us.ibm.com

(With help from many friends)

Copyright IBM 1996, 1997, 1998, 1999
Controlled Distribution
Protected under the procedures, processes, rights
rules, regulations, and retributions of
IBM Global Services
Intellectual Capital Management

###################################################################
#-----------------------------------------------------------------

# Copyright Information: Copyright IBM 1998
Controlled Distribution
Protected under the procedures, processes, rights
rules, and regulations of
IBM Global Services
Intellectual Property Management

This program is an IBM Type II Deliverable as
described in the IBM Customer Agreement and
relevant IBM services contracts.

IBM retains all rights to this program and does not
transfer any rights for replication or distribution
of this program except for the following:
1. Backup/archive copies taken as a normal
course of system maintenance.
2. Copying the program to a similar machine
within the same enterprise.

The customer agrees to restrict access to this
program as they would their own proprietary code,
and to notify IBM should unauthorized distribution
occur.
```

*FIG. 8A*

```

#                This program is distributed on an "as is" basis,
no warranty is expressed or implied.

#---------------------------------------

#---------------------------------------

# Description: Merge mirrored copies at filesystem level
#              Part of FSCPBK package, but independent of other
scripts in package.
# Operational Environment: AIX V4
# Input:
# Output:
# Return Value:
# Comments:
#   This script is built upon the AIX command rmfs and mkfscopy

#---------------------------------------

#---------------------------------------
# Version History: None

#---------------------------------------

#---------------------------------------

# Environmental Variables

#---------------------------------------
# Constants

# Variables
numeric_date=$(date +%m%d%y)
text_date=$(date +%d%b%Y)
typeset -i return_code
typeset -i retain_days=90
typeset -i in_retain_days
typeset -i in_copies
typeset -i mount_test
typeset -i exist_fs_test
typeset -i mount_fs_test
typeset -i exist_pv_test
typeset -i copies
invoked_name=$0
script_name=${invoked_name##*/}
# Process Control Variables
```

```
p_flag=0
s_flag=0
p_flag=0 l_flag=0
L_flag=0
r_flag=0

Files default_log_dir=/var/adm/scriptlogs
default_log_file=$script_name.$text_date
work_file1=/tmp/$script_name.wrk1

#--------------------------------------

# Function: show_usage
#     Description: Displays command usage syntax and exits
#     Input: None
#     Output: Usage message to standard error
#     Return Value: 2
#     Note: This function does not return. It completely exits.

#--------------------------------------
show_usage()
{
    print -u2 "                    "
    print -u2 "Usage: merge_fs_copy.ksh -p primaryfilesystem -s secondaryfilesystem [-l directory] [-r days] [ -L ]"
    print -u2 "          -p filesystem  Primary filesystem."
    print -u2 "                    "
    print -u2 "          -s filesystem  Secondary filesystem."
    print -u2 "                    "
    print -u2 "          -l directory   Log output directory."
    print -u2 "                    Default is" $default_log_dir
    print -u2 "                    "
    print -u2 "          -r days    Log retention period."
    print -u2 "                    Default is" $retain_days
    print -u2 "                    "
    print -u2 "          -L         Prevent results logging."
    print -u2 "                    "
    exit 2
}
#--------------------------------------

# Korn Shell Settings

#--------------------------------------
#set -o errexit    # Turn on error trapping and error exit mode
#set -o noclobber  # Prevent overwriting of existing files
```

```
#set -o noexec      # Perform syntax checking without execution
#set -o nolog       # Prevents storing function defs in history file
#set -o xtrace      # Turn on debug mode

#-------------------------------------

# Main Routine

#              _____
#            ____/ |       BRUTE FORCE APPLIED HERE!
#            |||||  |
#         /| __|_____|_   Suggestions for refinement and elegance
#        / |=(0 0 0 0)      are always welcome.
# 110110111/__|  --------
#-------------------------------------

log_dir=$default_log_dir
# Parse Command Line Arguments into Variables
while getopts p:s:l:Lr# c
do
  case $c in
  p)   # Set up the -f flag
       p_flag=1
       in_prime_filesystem=$OPTARG;;
  s)   # Set up the -n flag
       s_flag=1
       in_second_filesystem=$OPTARG;;
  L)   # Set up the -L flag
       L_flag=1;;
  l)   # Set up the -l flag
       l_flag=1
       log_dir=$OPTARG;;
  r)   # Set up the -r flag
       r_flag=1
       in_retain_days=$OPTARG;;
  :)   show_usage;;
  \?)  show_usage;;
  esac
done
shift $((OPTIND-1))

Deal with invocation errors

Test for mandatory flags if [[ (p_flag -eq 0) || (s_flag -eq 0) ]]; then
   show_usage
fi
```

```
# Configure Logging
if [[ $L_flag -eq 1 ]]; then
    log_file=/dev/null              # Log to bit bucket
elif [[ $l_flag -eq 1 ]]; then
    log_file=$in_log_dir/$default_log_file
    mkdir -p $in_log_dir 2>dev/null       #Create new log directory
else
    log_file=$default_log_dir/$default_log_file
    mkdir -p $default_log_dir 2>/dev/null # Create default log directory
fi
if [[ $r_flag -eq 1 ]]; then
    retain_days=$in_retain_days
fi

Clear old log files
find $log_dir -name "$script_name" -mtime $retain_days -exec rm {}\;

# Create new log file
exec 3>> $log_file # Open log file for writing
print -u3 "\n==================================================="
print -u3 "=                                                 ="
print -u3 "=  Systems Management Transaction Log             ="
print -u3 "=                                                 ="
print -u3 "=  Created by script:" $script_name
print -u3 "=       on system!" $(hostname)
print -u3 "=       at    !" $(date)
print -u3 "=                                                 ="
print -u3 "==================================================="

Perform Work

# Test for valid existing primary filesystem
exist_fs_test=$(lsfs -ac | grep "$in_prime_filesystem:" | wc -l)
if [[ $exist_fs_test -eq 0 ]]; then
    print -u2 "Primary filesystem" $in_prime_filesystem "does not exist."
    print -u3 "Primary filesystem" $in_prime_filesystem "does not exist."
    exit 99
else
    p_filesystem=$in_prime_filesystem
fi

# Test for valid existing secondary filesystem
exist_fs_test=$(lsfs -ac | grep "$in_second_filesystem:" | wc -l)
if [[ $exist_fs_test -eq 0 ]]; then
    print -u2 "Secondary filesystem" $in_second_filesystem "does not exist."
    print -u3 "Secondary filesystem" $in_second_filesystem "does not exist."
    exit 99
else
    s_filesystem=$in_second_filesystem
fi
```

FIG. 8F

```
# Determine LVs of both filesystems
p_lv=$(lsfs -oc | grep "$p_filesystem:" | cut -f2 -d : | cut -c6-)
s_lv=$(lsfs -oc | grep "$s_filesystem:" | cut -f2 -d : | cut -c6-)

# Test for LVs in same volume group
#p_vg=$(lslv $p_lv | grep "VOLUME GROUP" | cut -c60-)
#p_vg=$(lslv $p_lv | grep "VOLUME GROUP" | cut -c60-)
p_vg=$(lslv $p_lv | grep "VOLUME GROUP" | awk '{ print $6}')
s_vg=$(lslv $s_lv | grep "VOLUME GROUP" | awk '{ print $6 }')
if [[ $p_vg != $s_vg ]];then
    print -u2 "Filesystems not in same volume groups" $p_vg $s_vg
    print -u3 "Filesystems not in same volume groups" $p_vg $s_vg
    exit 98
fi

# Test that first filesystem is not maximum mirrored
copies=$(lslv $p_lv | grep COPIES | awk'{ print $2 }')
# echo $copies      Use for debug in case of interversion output change
if [[ $copies -eq 3 ]];then
    print -u2 "Primary filesystem" $p_filesystem "is mirrored."
    print -u3 "Primary filesystem" $p_filesystem "is mirrored."
    exit 97
fi

# Test that second filesystem is not mirrored
copies=$(lslv $s_lv | grep COPIES | awk{ print $2 }')
# copies=$(lslv $s_lv | grep COPIES | cut -c 21)
# echo $copies      Use for debug in case of interversion output change
if [[ $copies -ge 2 ]];then
    print -u2 "Secondary filesystem" $s_filesystem "is mirrored."
    print -u3 "Secondary filesystem" $s_filesystem "is mirrored."
    exit 96
fi

# Test for LVs same size
#p_lps=$(lslv $p_lv | grep LPs | grep -v MAX | cut -c20-23)
#s_lps=$(lslv $s_lv | grep LPs | grep -v MAX | cut -c20-23)
p_lps=$(lslv $p_lv | grep LPs | grep -v MAX | awk'{ print $2 }')
s_lps=$(lslv $s_lv | grep LPs | grep -v MAX | awk'{ print $2 }')
if [[ $p_lps != $s_lps ]];then
    print -u2 "Filesystems not in same size logical volumes."
    print -u3 "Filesystems not in same size logical volumes."
    exit 95
fi

# Test for secondary LV on multiple disks (Requested removal by IDX ESD)
#copies=$(lslv -l $s_lv | grep hdisk | wc -l)
```

```
#if [[ $copies -gt 1 ]]; then
#    print -u2 "Secondary filesystem resides on more than one disk."
#    print -u3 "Secondary filesystem resides on more than one disk."
#    exit 94
#fi

# Unmount secondary filesystem
mount_fs_test=$(mount | grep "$s_filesystem " | wc -l)
if [[ $mount_fs_test -eq 1 ]]; then
    umount $s_filesystem
fi

Delete copy fs in preparation for merge return_code=0
pvol=$(lslv -l $s_lv | grep hdisk | cut -f1 -d " ")
copies=$(lslv $p_lv | grep COPIES | awk'{ print $2 }')
((copies=$copies+1))

rmfs $s_filesystem >>$log_file 2>>$log_file
return_code=$?

# Test for successful filesystem delete
if [[ $return_code -ne 0 ]]; then
    print -u2 "Filesystem Delete not successful."
    print -u3 "Filesystem Delete not successful."
    exit 2
fi

# Perform merge
mklvcopy -k -s y $p_lv $copies $pvol
return_code=$?

# Test for successful LV merge
if [[ $return_code -ne 0 ]]; then
    print -u2 "Filesystem Merge not successful."
    print -u3 "Filesystem Merge not successful."
    exit 1
fi if [[ $return_code -eq 0 ]]; then
    print -u3 "\n Completed successfully at" $(date)
else
    print -u3 "\n Completed UNSUCCESSFULLY at" $(date)
fi
```

*FIG. 8G*

METHOD AND SYSTEM TO ADMINISTER MIRRORED FILESYSTEMS

BACKGROUND OF THE INVENTION

1. Technical Field

The present invention relates to information processing technology. More particularly, the present invention relates to providing means for improving the efficiency and reliability of storing data. Even more particularly, the present invention relates to the handling of data which is mirrored across multiple media.

2. Description of Related Art

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: __read—for reading from the disk unit; __write—for writing to the disk unit; __getch—for reading a character from a terminal; putch—for writing a character to the terminal; and __ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called i-node numbers, are used only within the UNIX operating system kernel itself. While UNIX uses i-node number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding i-node numbers. Given the name of a file, UNIX looks in the file's directory and obtains the corresponding i-node number for the file. With this i-node number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct i-node is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

Disk failure is the most common hardware failure in the storage system, followed by failure of adapters and power supplies. Protection against disk failure primarily involves configuration of the logical volumes. To protect against adapter and power supply failures, a popular configuration includes two adapters and at least one disk per adapter, with mirroring across adapters, without regard to the number of active blocks in the volume group. By mirroring the original data, copies are available in case of an interruption. Read efficiency is also improved because the logical volume manager is free to choose a less busy drive from which to read. RAID (redundant array of independent disks) is an alternative mirroring technique where data is striped block by (512-byte) block, but portions of several (not necessarily all) of the drives are set aside to hold parity information. This spreads the load of writing parity information more evenly.

As information systems (IS) organizations become increasingly concerned about "seven by twenty four" (seven days per week, 24 hours per day) operation, they turn to various techniques for ensuring data availability. Most common among these techniques is data mirroring, which creates and maintains identical copies of data on redundant disks. While mirroring greatly increases the availability of critical files and applications by ensuring that a copy will be accessible, even if a disk failure is experienced, disadvantages do exist to the technique. Firstly, the processes of mirroring and unmirroring data can be risky, and administrator error during these processes can easily result in lost or corrupted data. Secondly, the mere existence of seven by twenty four databases often presents problems in practical implementation. These problems might include difficulties in backing up data if the application does not support hot or live backups, or the mirror might complicate the process of changing out hardware without endangering the application. Thirdly, mirroring is usually accomplished using logical volumes instead of filesystems. Logical volumes are structures for managing disk organization. Logical volumes are less visible to users and applications than are the files, directories and filesystems that make up the conventional data organization structure. Managing mirroring at the logical volume level instead of the filesystem level can be more confusing when it requires coordination with the application.

It would be advantageous to provide a means for reducing the risk associated with mirroring. It would also be advantageous to provide a means for reducing the difficulties associated in backing up data. It would be further advantageous to provide a means for mirroring using a more visible data structure.

SUMMARY OF THE INVENTION

The present invention relates to a system and method for concise, automated splitting of a mirrored logical volume, so that either hardware or software maintenance can occur with the data or disks upon which the data resides. The invention further provides a means to remerge such split mirrored logical volumes. Finally, the present invention allows for splitting and merging to occur at the filesystem level rather than at the logical volume level, which is more visible and, therefore, more user friendly than using the logical volumes. The automated splitting process begins by setting appropriate names and values for the new and old filesystems, physical volumes, and logs. Script progress logs are used by the split script to allow systems administrators to review successes, failures, and other issues experienced by the scripts. Next, names and values are checked for validity, and to see that a specified value is not contrary to the operating system's parameters. The split is performed with specified copies placed into specified logical volume and filesystem. The automated merging process begins by setting appropriate names and values for log files, and by setting filesystem names to be merged and synchronized. Script progress logs are used by the merge script to allow systems administrators to review successes, failures, and other issues experienced by the scripts. Next, names and values are checked for validity and to see that a specified value is not contrary to the operating system's parameters. The secondary filesystem is deleted, and the logical volumes are merged, creating the mirror out of the secondary filesystem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 7A–7I depict a mirror split script representing an exemplary embodiment of the present invention; and FIGS. 8A–8H depict a filesystem merge script representing an exemplary embodiment of the present invention.

DETAILED DESCRIPTION OF THE PREFERRED EMBODIMENT

Figure 1:
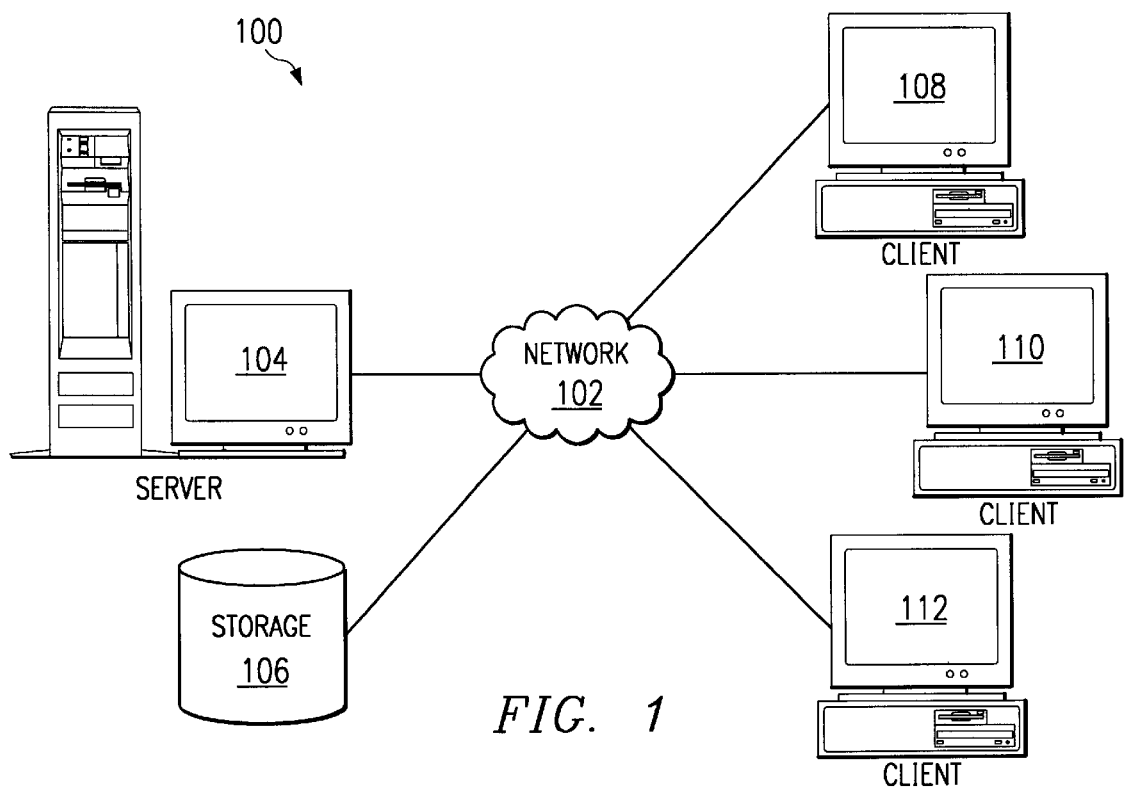
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
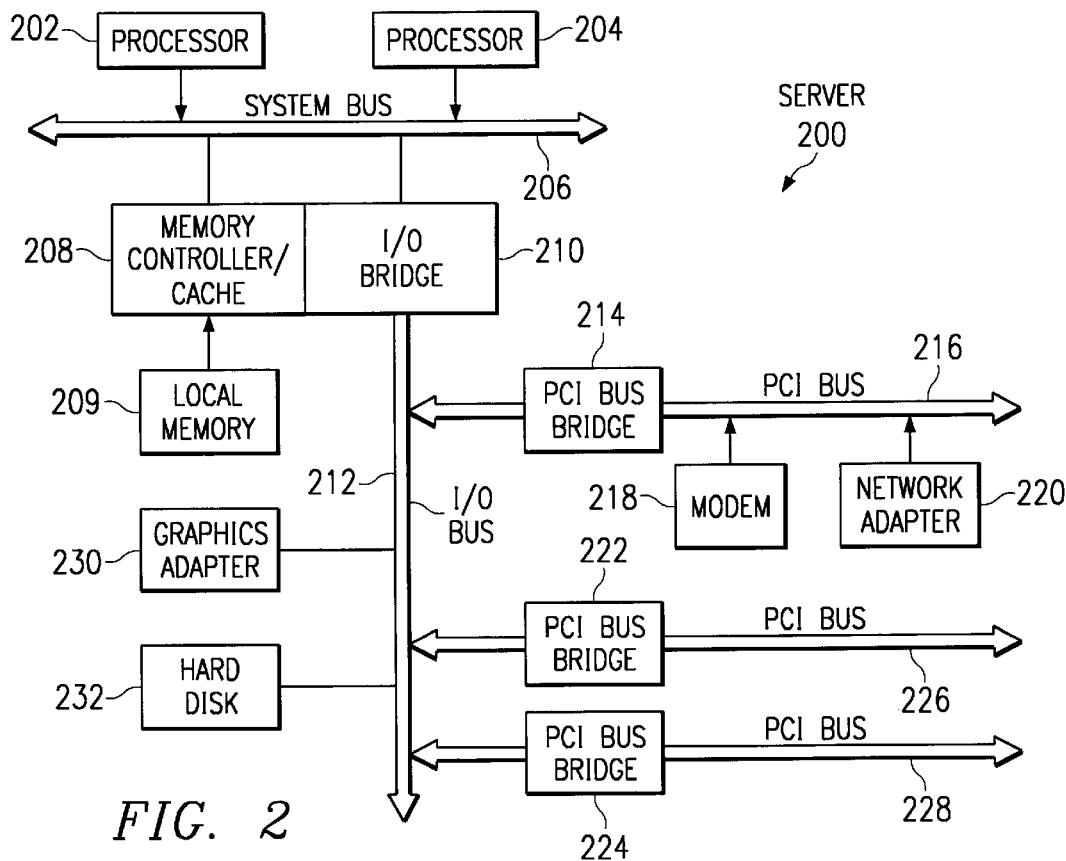
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
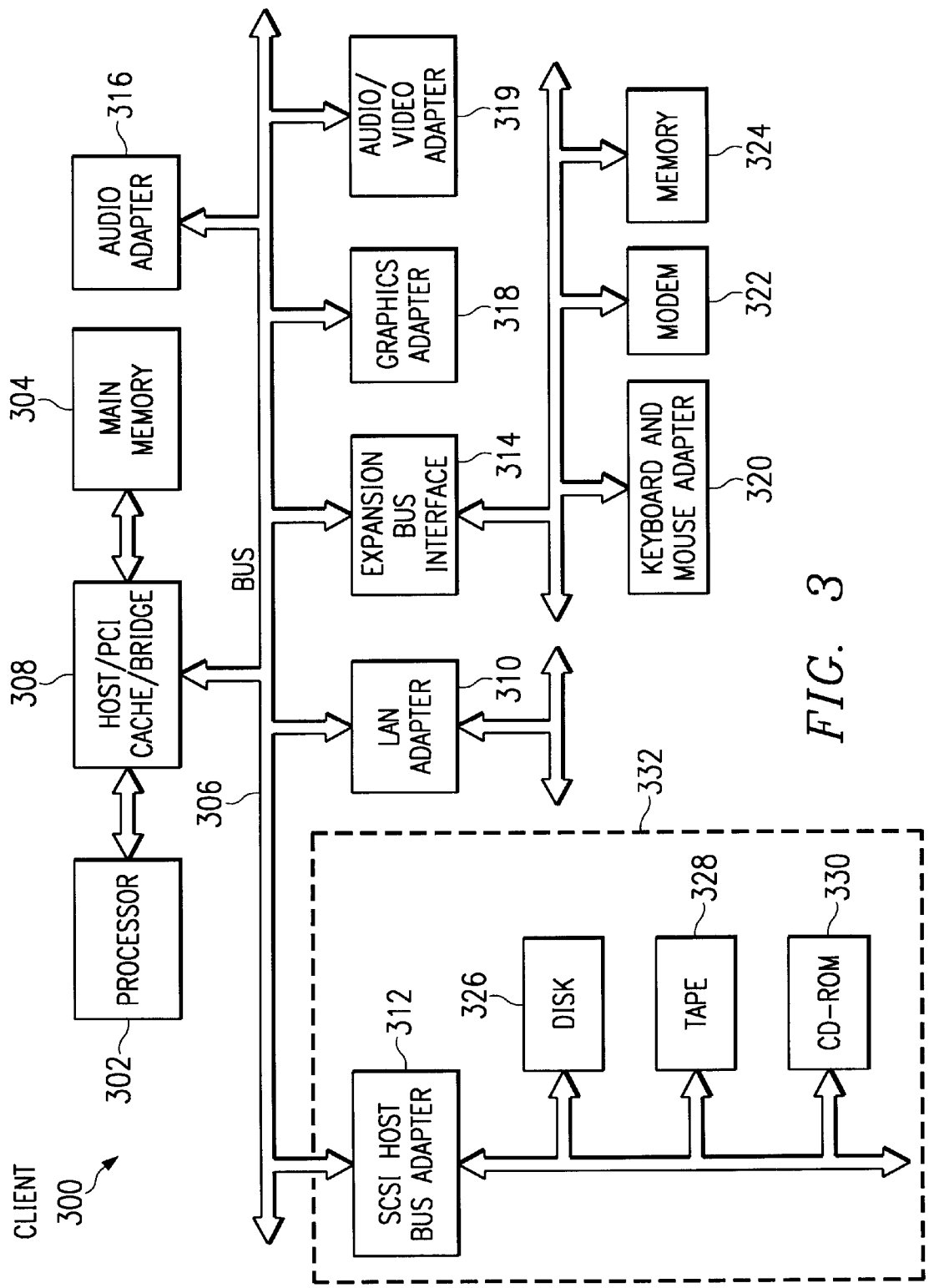
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

Figure 4A:
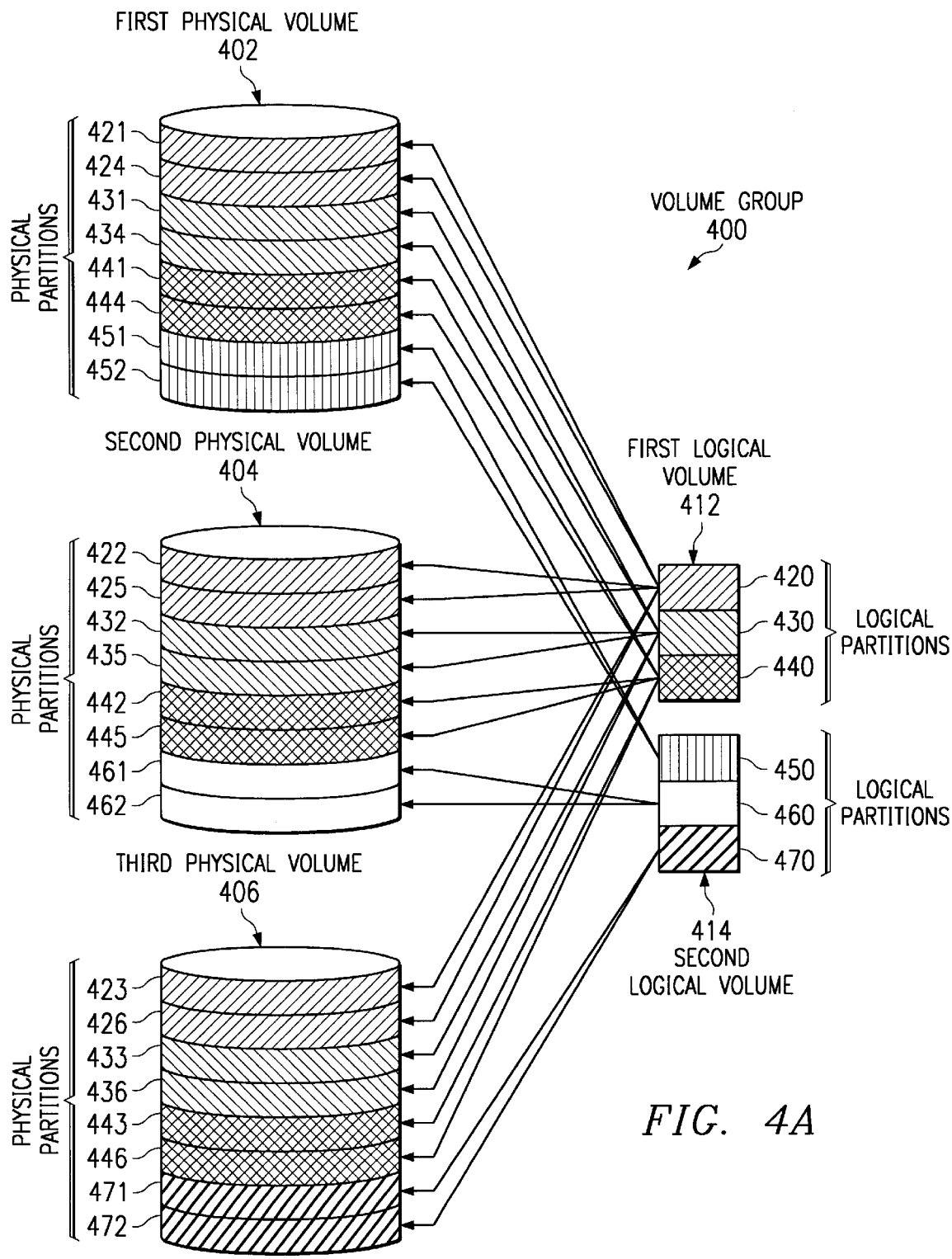
FIG. 4A illustrates the relationship among physical volumes, physical devices, and logical volumes within a volume group.

Before discussing the present application, a cursory discussion of a volume group in a UNIX based system might be helpful. FIG. 4A illustrates the relationship among physical volumes, physical devices, and logical volumes within a volume group. This relationship may be present on any of a server or client depicted on FIGS. 2 and 3 above, and may exist across a network such as that depicted in FIG. 1 above.

A hierarchy of structures is used to manage fixed-disk storage. Each individual fixed-disk drive, called a physical volume (PV), has a name, such as /dev/hdisk0. PVs are depicted as first PV 402, second PV 404, and third PV 406. PVs 402, 404 and 406 belong to a volume group (VG)—volume group 400. All of the physical volumes in a volume group are divided into physical partitions (PPs). In the depicted example, PV 402 is divided into PPs 421, 424, 431, 434, 441, 444, 451 and 452; PV 404 is divided into PPs 422, 425, 432, 435, 442, 445, 461 and 462; and PV 406 is divided into PPs 423, 426, 433, 436, 443, 446, 471 and 472, which are all of the same size.

Within volume group 400, one or more logical volumes (LVs) are defined. First logical volume 412 and second logical volume 414 are depicted. Logical volumes are groups of information located on physical volumes within the volume group. Data on logical volumes appears to be contiguous to the user but can be discontiguous on the physical volumes in the volume group.

Logical volumes may correspond to physical partitions located on more than a single physical volume. In the present example, each of LPs 420, 430 and 440 is allocated a pair of PPs on each of the three physical volumes. PPs 421, 424, 431, 434, 441 and 444 on PV 402 are allocated, two each, to LPs 420, 430 and 440, respectively. The PPs on PVs 404 and 406 are similarly allocated to LPs 420, 430 and 440.

Mirroring requires allocation of extra physical partitions. As a practical matter, a mirror is usually allocated on a separate physical volume from the original physical volume so that, if the disk containing the original logical partition becomes unavailable, the mirror remains available on another physical volume.

Figure 4B:
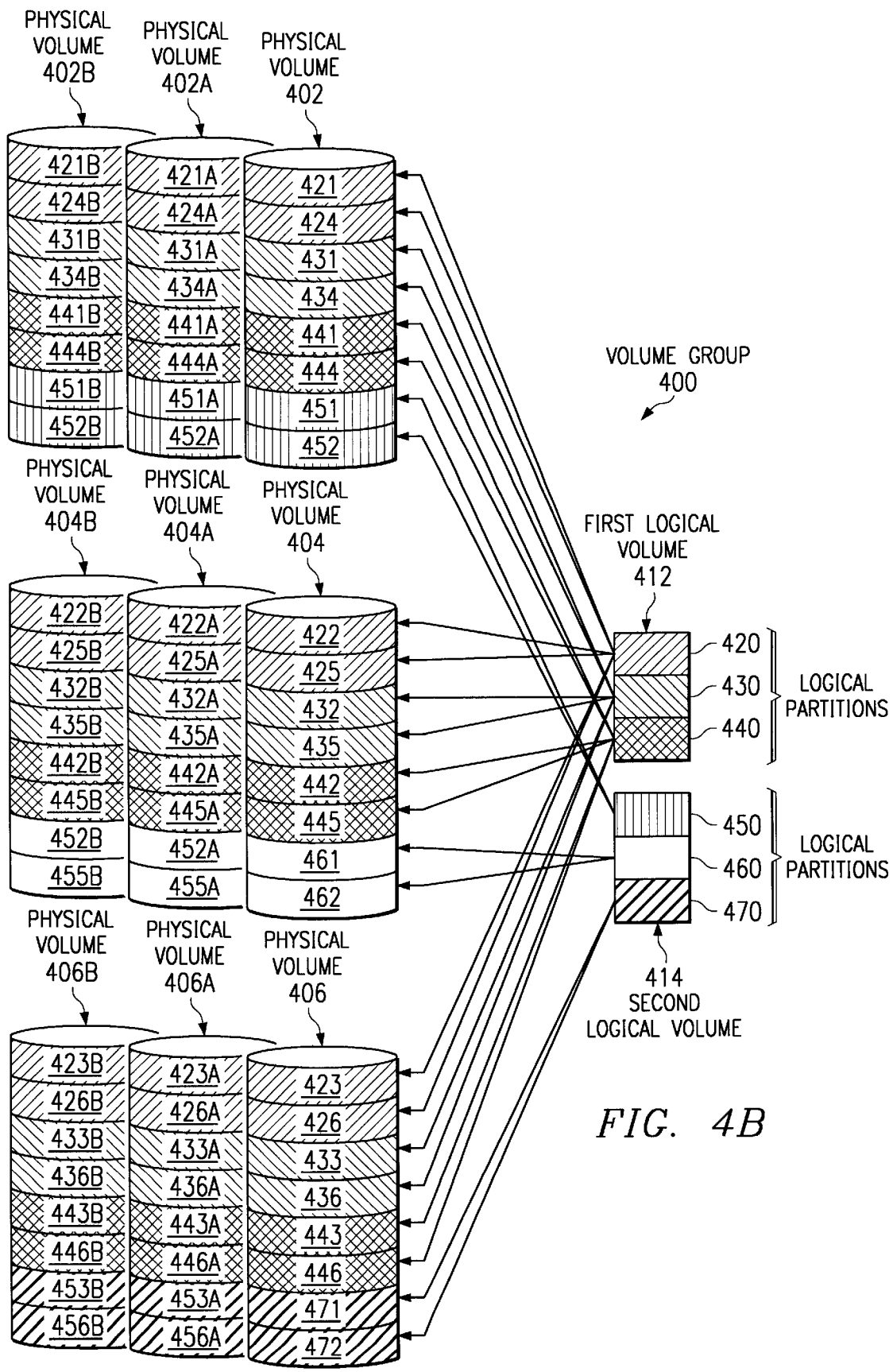
FIG. 4B depicts volume group 400, including mirrors.

FIG. 4B depicts volume group 400, including mirrors. The data stored on each of PVs 402, 404 and 406 are mirrored. Each of the physical partitions servicing a logical partition corresponds to a mirror physical partition in PVs 402A, 402B, 404A, 404B, 406A and 406B. A and B denote the physical volumes and physical partitions used in the first and second mirrors; i.e. the original logical partition stored on PP 421 is mirrored by copy one on PP 421A and copy two on PP 421B, and so on. It is a misnomer to say that the physical partitions are mirrored; actually, the logical volume corresponding to the physical volume is mirrored. However, the physical volume servicing the mirror will normally contain the exact number of physical partitions for storing the mirrored logical volume as are allocated in the original physical volume for the original logical volume.

The mirror configuration depicted in FIG. 4B shows two complete mirrors for mirroring LVs 412 and 414; thus, two copies of the logical volumes are being updated during each operation. However, the mirrors for each of the logical partitions allocated for LV 412 span three physical volumes or drives, while the logical partitions of LV 414 are each serviced by only a single disk. For instance, examine LP 420 of LV 412. LP 420 is serviced by six physical partitions, PPs 421 through 426, which are located, two each, on all of PVs 402, 404 and 406. (Note the corresponding fill pattern depicted in FIG. 4B.) In contrast, LP 450 is serviced by PPs 451 and 452, located on one disk, PV 402, such that the logical volume is serviced by a single disk. Each mirror servicing original LPs 450, 460 and 470 stores a copy of the original logical partition on a pair of physical partitions located on a single physical volume.

As discussed above with respect to LV 412, copy one of original LP 420 is serviced by PPs 421A through 426A, located on PVs 402A, 404A and 406A. Thus, PPs 421A to 426A are allocated for servicing physical mirror one. Copy two of original LP 420 is serviced by PPs 421B to 426B located on all of PVs 402B, 404B and 406B. Thus, PPs 421B to 426B are allocated for serving mirror two.

Typically, mirroring and unmirroring, such as that depicted above in FIGS. 4A and 4B, are accomplished manually, accompanied by all the risks and timelines involved with the processes. Additionally, working at the logical volume level, the procedures required when mirroring and unmirroring are executed manually and are cumbersome. Furthermore, as the logical volumes are an additional level of abstraction from the filesystems and directories actually accessed by users and applications, it is easy for systems administrators to make mistakes.

The present invention relates to a system and method for a concise, automated splitting of a mirrored logical volume and its associated filesystem, so that either hardware or software maintenance or data management can occur with the data or disks upon which the data resides. The invention further provides for a means to remerge such split mirrored logical volumes and their associated filesystems. By automating the processes described above, and by providing a means of working at the filesystem level (as opposed to the logical volume level), the present invention takes much of the risk out of the mirroring/unmirroring process. It also speeds up the process, such that operations requiring unmirrored data sets can be accomplished in a more expeditious manner; and it provides a means for administrators to work with more intuitive data constructs, i.e. those of filesystems rather than logical volumes. Finally, the present invention allows for splitting and merging to occur at the filesystem level rather than the logical volume level, which is more visible and, therefore, more user friendly than the logical volumes.

A preferred embodiment of the present invention is applicable to and extendible across a variety of operating systems. Therefore, the implementation of an automated method for splitting and re-merging of a mirrored volume group is not limited to AIX or UNIX type operating systems; but instead, it may be incorporated on any type of operating system. However, the exemplary embodiment described herein resides on a UNIX system; therefore, the description of this implementation pertains particularly to such computer systems.

The present invention provides a solution to permit such operations to take place. The process is depicted in the flowchart illustrated in FIGS. 5A and 5B, which represents a mirror split, while FIGS. 6A and 6B represent a process for the subsequent merging of the split filesystems. The scripts in FIGS. 7A through 7I and FIGS. 8A through 8H represent an exemplary embodiment of such an invention. The processes manifested in these scripts automate a great many of the tasks and checks associated with administering mirrored filesystems, thereby reducing their risks. These processes also speed up mirror splits and merges, thus simplifying maintenance and data backups; and they permit administrators to work at the more obvious filesystem level rather than the more abstract logical volume level.

Figure 5:
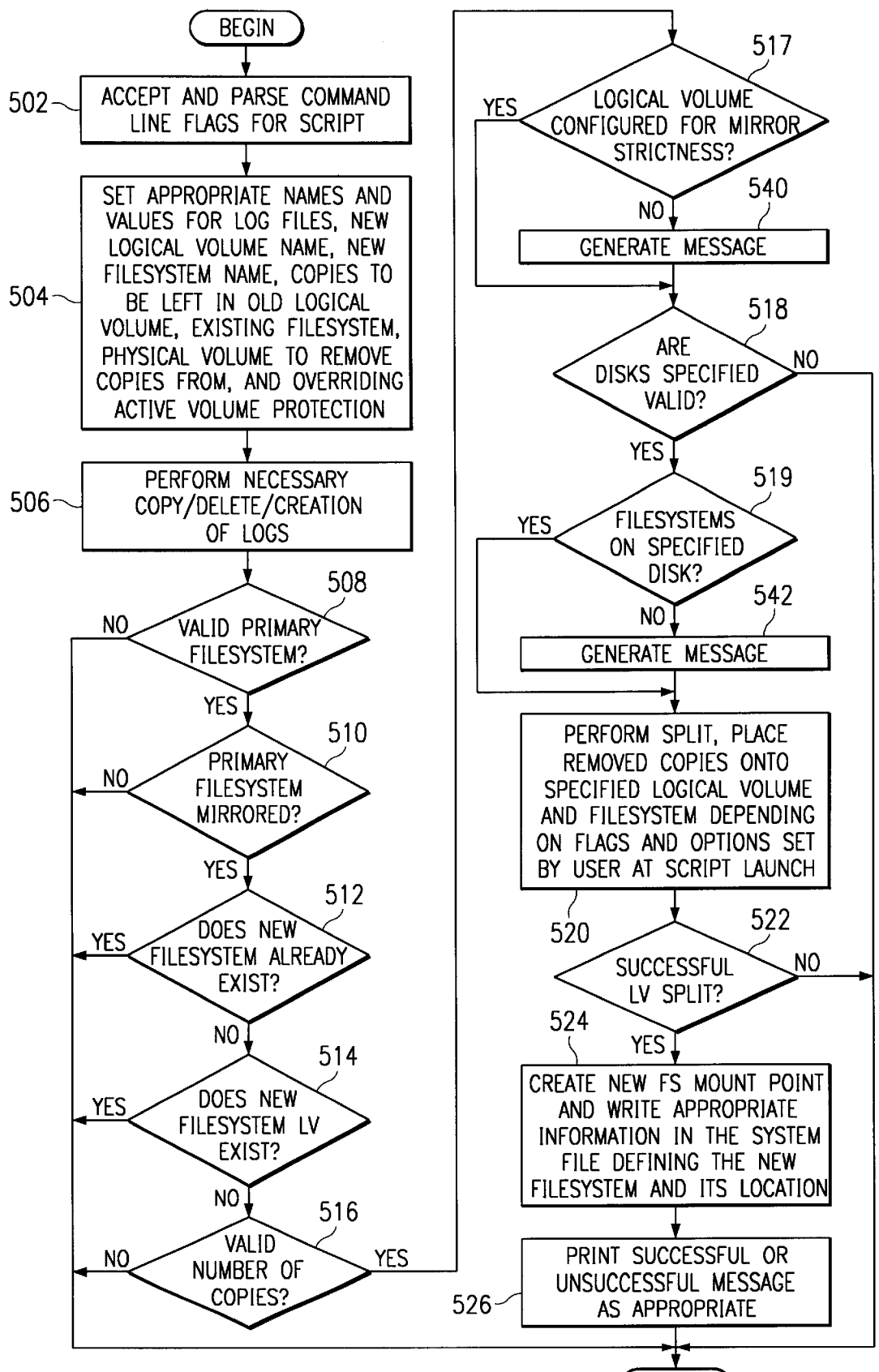
FIG. 5 is a flowchart depicting a process for splitting a mirror, enabling a system administrator to service the original mirror while maintaining a hot mirror.

FIG. 5 illustrates a flowchart depicting a process for splitting a mirror, which enables a system administrator to service the original mirror while maintaining a hot mirror. The process begins with the mirror split script being accepted and command line flags being parsed (step 502). Next, appropriate names and values are set for the old and new mirrors. These values may include, for example, log files, a new logical volume name, a new filesystem name, copies to be left in the old logical volume, the existing filesystem, a physical volume to remove copies from, and overriding active volume protection (step 504). The necessary process logs are copied, deleted and created as needed (step 506).

After the logs are prepared, a series of tests is performed on the existing mirrors to ensure that valid starting conditions exist. An important feature of the present invention is that the script is generally run automatically at scheduled times without human participation. Therefore, if problems are encountered, the program needs to log and exit so the system administrator can perform follow-up analysis. Initially, a check is made to ensure that the specified old filesystem exists (step 508). If it does not exist, the script exits. If the old filesystem exists, a check is made to ensure that the specified old filesystem is mirrored (step 510). If it is not mirrored, the script exits. If the specified old filesystem is mirrored, a check is made to ensure that the specified new filesystem name is valid (step 512). If the new name does exist, the script exits. If the name does not exist, a check is made to ensure that the specified new logical volume name is valid (step 514). If the new logical volume does exist, the script exits. If it is mirrored, a check is made to ensure that the specified number of copies is valid (step 516). If the number of copies is not valid, the script exits. If the number of copies is valid, a check is made for another important condition, i.e. whether the logical volume is properly configured for mirror strictness (step 517). A 'strict' allocation states that no copies for a logical partition are allocated on the same physical volume; therefore, in the event of a physical volume disk going down, a usable copy is available from another physical volume. If the strictness condition is not met, the process flows to step 540, where a message is generated noting that the condition was not met, and the process proceeds to step 518. Returning to step 517, if the strictness condition is met, a check is made to ensure that the disks specified are valid (step 518).

If the disks specified are not valid, the script exits. If the disks are valid, a check is made as to whether the filesystem specified are on the disk specified (step 519). Failure to meet this condition does not fail the script, but does generate important message (step 542). From there the process proceeds to step 520. Returning to step 519, if the filesystems are on the specified disk, the split is performed, placing removed copies onto the specified logical volume and filesystem. A check is made to ensure that the specified new filesystem name is valid (step 520). Importantly, the split is performed one of four different ways, depending on which flags and options the user provides at script launch.

A determination is made as to whether the split was successful (step 522). If not, the process ends. If the split is successfully completed, then a mount point is created for a new filesystem and a new stanza entered on the system file that defines filesystems, to describe the new filesystem and its location (step 524). Finally, a message is printed, notifying the user of success, and appropriate log entries are created (step 526). Clearly, a message could also be printed which details the failure that caused an unsuccessful split.

Figure 6:
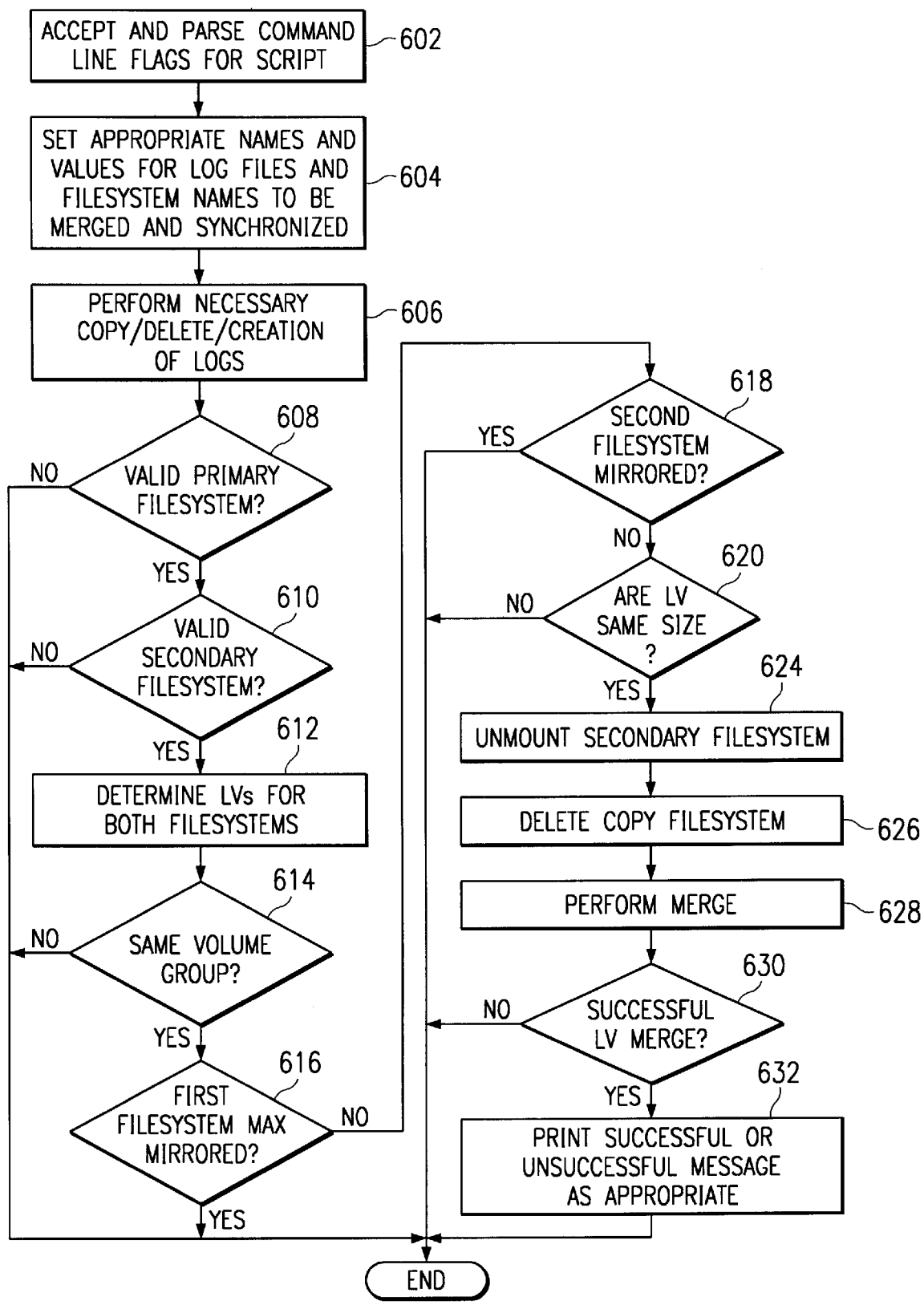
FIG. 6 is a flowchart which depicts a process for merging the filesystem subsequent to a mirror split, such as after the system administrator has serviced the original mirror.

FIG. 6 illustrates a flowchart depicting a process for merging the filesystem subsequent to a mirror split, such as after the system administrator has serviced the original mirror. The process begins with the filesystem merge script being accepted and command line flags being parsed (step 602). Next, appropriate names and values are set for log files and filesystem names to be merged and synchronized (step 604). The necessary process logs are deleted and created as needed (step 606).

After the logs are prepared, a series of tests is performed to ensure that the filesystems can be merged. As discussed above, an important feature of the present invention is that the script is generally run automatically at scheduled times without human participation. Therefore, if problems are encountered the work needs to log and exit, so the system administrator can perform post analysis. Initially, a check is made to ensure that a specified primary filesystem exists (step 608). If it does not exist, the script exits. If the primary filesystem exists, a check is made to ensure that the specified secondary filesystem exists (step 610). If the secondary filesystem does not exist, the script exits If it does exist, then the logical volumes associated with each filesystem are determined (step 612).

Once the logical volumes have been determined, a check is made to ensure that each logical volume is within the same volume group (step 614). Each logical volume must be within the same volume group in order to maintain synchronization. If the logical volumes are not within the same volume group, the script exits. If they are within the same volume group, a check is made to ensure that the primary filesystem does not already have a maximum number of copies (step 616). The maximum number of copies is a value which is dependent upon the type of operating system. For instance, this value is limited to three in AIX but can be adapted to the limitations of other operating systems as well.

If the maximum number of filesystem copies already exists, a new copy cannot be created, and the script exits. If another copy can be created, a check is made to ensure that the secondary filesystem is not mirrored (step 618). If the second filesystem is mirrored, the process ends, and the script exists. If the second filesystem is not mirrored, a check is made to ensure that the logical volumes associated with each filesystem are the same size (step 620). If they are not the same size, the script exits. Otherwise, the secondary filesystem is unmounted (step 624), and the secondary filesystem is deleted in order to work with the underlying logical volume (step 626). The logical volumes are then merged, creating the mirror out of the secondary filesystem (step 628).

A determination is then made as to whether the merge was successful (step 630). If not, the process ends. If the merge has been successfully completed, a message is printed, notifying the user of success; and appropriate log entries are created (step 632). Clearly, a message could also be printed which details the failure that caused an unsuccessful merge.

By permitting the specification of mirrors at the filesystem level (rather than the logical volume level), as well as by automating the entire administrative process, the present invention ensures that large scale mirror splits and merges can be accomplished successfully and consistently. This, in turn, allows users to take filesystem copies offline for backups, for hardware maintenance, or for any other data manipulation which may be required.

FIGS. 7A–7I depict a mirror split script representing an exemplary embodiment of the present invention. The script is called "split_fs_copy.ksh". This script will split an AIX filesystem mounted on a mirrored logical volume into two separate filesystems. An override flag will be used to force the split in the case where the filesystem is mounted. This script will return various error codes if it is unable to complete the split function successfully. This script is called by the fscpbk_select.ksh script above.

FIGS. 8A–8H depict a filesystem merge script representing an exemplary embodiment of the present invention. The script is called "merge_fs_copy.ksh". This script will merge two separate AIX filesystems mounted on separate logical volumes into one single filesystem mounted on two mirrored logical volumes. This script will return various error codes if it is unable to complete the merge function successfully. This script recreates the new secondary mirror on the disk where the "alternate" filesystem has been split off, according to the AIX mirror policies set for the primary logical volume.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for splitting a mirrored filesystem, comprising:
    identifying an existing filesystem on an existing logical volume;
    determining if said existing filesystem is mirrored, said existing logical volume including both said existing filesystem and a mirrored copy of said existing filesystem within said existing logical volume when said existing filesystem is mirrored; and
    only in response to a determination that said existing filesystem is mirrored:
        splitting the existing logical volume, wherein said mirror between said existing filesystem and said mirrored copy of said existing filesystem is split;
        placing said mirrored copy of said existing filesystem on a new logical volume; and
        identifying said placed mirrored copy as a new filesystem, wherein said existing filesystem remains on said existing logical volume and said new filesystem exists on said new logical volume, and further wherein said existing filesystem and said new filesystem are not mirrored.

2. The method recited in claim 1, further comprising the steps of:
    scheduling a plurality of times to execute an automated script, and
    executing said automated script at each of said plurality of times, wherein said steps of identifying an existing filesystem on an existing logical volume, determining if said existing filesystem is mirrored; and only in response to a determination that said existing filesystem is mirrored: splitting the existing logical volume, placing said mirrored copy of said existing filesystem on a new logical volume; and identifying said placed mirrored copy as a new filesystem are performed in response to executing said automated script.

3. The method recited in claim 2, wherein the script is terminated on the basis of a filesystem violating a system parameter.

4. The method recited in claim 1, wherein a disk servicing the existing filesystem is serviced.

5. The method recited in claim 1 further comprises:
    checking the logical volume split.

6. The method of claim 1 further comprising:
    specifying a first filesystem;
    specifying a second filesystem;
    validating the first filesystem and the second filesystem;
    determining a first logical volume for a first filesystem;
    determining a second logical volume for a second filesystem; and
    creating a mirror out of the second filesystem by merging the first and second logical volumes.

7. The method recited in claim 6, further comprising the steps of:
    scheduling a plurality of times to execute an automated script; and
    executing said automated script at each of said plurality of times, wherein said steps of specifying a first filesystem, specifying a second filesystem, validating the first filesystem and the second filesystem, determining a first logical volume for a first filesystem, determining a second logical volume for a second filesystem; and, creating a mirror out of the second filesystem by merging the first and second logical volumes are performed in response to executing said automated script.

8. The method recited in claim 6, further comprising the step of terminating said script in response to a failure to validate said filesystems.

9. The method recited in claim 6, wherein, prior to merging, the method comprises:

confirming that the first logical volume and the second logical volume are of equal size.

10. The method recited in claim 6, wherein, prior to merging, the method comprises:

confirming that the second filesystem is not mirrored.

11. The method recited in claim 6, wherein, prior to merging, the method comprises:

confirming that the maximum amount of copies do not exist for the first filesystem.

12. The method recited in claim 6 further comprises:

checking the filesystem merger for success.

13. A data processing system for splitting a mirrored filesystem, comprising:

means for identifying an existing filesystem on an existing logical volume; means for determining if said existing filesystem is mirrored, said existing logical volume including both said existing filesystem and a mirrored copy of said existing filesystem within said existing logical volume when said existing filesystem is mirrored; and only in response to a determination that said existing filesystem is mirrored:

means for splitting the existing logical volume, wherein said mirror between said existing filesystem and said mirrored copy of said existing filesystem is split;

means for placing said mirrored copy of said existing filesystem on a new logical volume; and means for identifying said placed copy as a new filesystem, wherein said existing filesystem remains on said existing logical volume and said new filesystem exists on said new logical volume, and further wherein said existing filesystem and said new filesystem are not mirrored.

14. The system recited in claim 13, further comprising:

means for scheduling a plurality of times to execute an automated script; and means for executing said automated script at each of said plurality of times, wherein said steps of identifying an existing filesystem on an existing logical volume, determining if said existing filesystem is mirrored; and only in response to a determination that said existing filesystem is mirrored: splitting the existing logical volume, placing said mirrored copy of said existing filesystem on a new logical volume; and identifying said placed mirrored copy as a new filesystem are performed in response to executing said automated script.

15. The system recited in claim 14, wherein the script is terminated on the basis of a filesystem violating a system parameter.

16. The system recited in claim 13, wherein a disk servicing the existing filesystem is serviced.

17. The system recited in claim 13 further comprising:

checking means for checking the logical volume split.

18. The system according to claim 13, further comprising:

means for specifying a first filesystem;

means for specifying a second filesystem;

means for validating the first filesystem and the second filesystem;

means for determining a first logical volume for a first filesystem;

means for determining a second logical volume for a second filesystem; and means for creating a mirror out of the second filesystem by merging the first and second logical volumes.

19. The system recited in claim 18, further comprising:

means for scheduling a plurality of times to execute an automated script; and means for executing said automated script at each of said plurality of times, wherein said steps of specifying a first filesystem, specifying a second filesystem, validating the first filesystem and the second filesystem, determining a first logical volume for a first filesystem, determining a second logical volume for a second filesystem; and, creating a mirror out of the second filesystem by merging the first and second logical volumes are performed in response to executing said automated script.

20. The system recited in claim 18, wherein the script is terminated on the basis of a filesystem violating a system parameter.

21. The system recited in claim 18, wherein, prior to merging, the system comprises:

confirming means for confirming that the first logical volume and the second logical volume are of equal size.

22. The system recited in claim 18, wherein, prior to merging, the system comprises:

confirming means for confirming that the second filesystem is not mirrored.

23. The system recited in claim 18, wherein, prior to merging, the system comprises:

confirming means for confirming that the maximum amount of copies do not exist for the first filesystem.

24. The system recited in claim 18 further comprises:

checking means for checking the filesystem merger for success.

25. A computer program product in a computer readable media for use in a data processing system for splitting a mirrored filesystem, comprising:

instruction means for identifying an existing filesystem on an existing logical volume;

instruction means for determining if said existing filesystem is mirrored, said existing logical volume including both said existing filesystem and a mirrored copy of said existing filesystem within said existing logical volume when said existing filesystem is mirrored; and only in response to a determination that said existing filesystem is mirrored:

instruction means for splitting the existing logical volume, wherein said mirror between said existing filesystem and said mirrored copy of said existing filesystem is split;

instruction means for placing said mirrored copy of said existing filesystem on a new logical volume; and instruction means for identifying said placed copy as a new filesystem, wherein said existing filesystem remains on said existing logical volume and said new filesystem exists on said new logical volume, and further wherein said existing filesystem and said new filesystem are not mirrored.

26. The computer program product in a computer readable media for use in a data processing system for creating mirrored filesystems according to claim 25, further comprising:

instruction means for specifying a first filesystem;

instruction means for specifying a second filesystem;

instruction means for validating the first filesystem and the second filesystem;

instruction means for determining a first logical volume for a first filesystem;

instruction means for determining a second logical volume for a second filesystem; and instruction means for creating a mirror out of the second filesystem by merging the first and second logical volumes.

* * * * *